(12) United States Patent
Singer et al.

(10) Patent No.: US 6,586,901 B1
(45) Date of Patent: Jul. 1, 2003

(54) METHODS AND APPARATUS SUITABLE FOR FACILITATING CONTROL OF AN AIRCRAFT RUDDER

(75) Inventors: Donald James Singer, Peoria, AZ (US); Dean Richard Wilkens, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/598,865

(22) Filed: Jun. 21, 2000

(51) Int. Cl.$^7$ ............................................... G05B 11/01
(52) U.S. Cl. ................. 318/560; 318/434; 318/586; 318/648; 318/584; 318/617; 318/632; 318/649
(58) Field of Search ................. 318/560, 434, 318/635, 586, 591, 648, 654, 584, 585, 616, 617, 624, 632, 649, 580; 701/4, 70, 40

(56) References Cited

U.S. PATENT DOCUMENTS

| | | | |
|---|---|---|---|
| 3,848,172 A | 11/1974 | Thomas | |
| 3,848,833 A | 11/1974 | Rauschelbach | |
| 4,067,517 A | * 1/1978 | Barnum | 318/585 |
| 5,375,794 A | 12/1994 | Bleeg | |
| 5,669,582 A | 9/1997 | Bryant et al. | |
| 5,791,596 A | 8/1998 | Gautier et al. | |
| 5,857,160 A | * 1/1999 | Dickinson et al. | 701/41 |
| 6,056,371 A | * 5/2000 | Lin et al. | 701/70 |
| 6,122,584 A | * 9/2000 | Lin et al. | 701/70 |
| 6,226,579 B1 | * 5/2001 | Hackl et al. | 701/41 |

* cited by examiner

*Primary Examiner*—Karen Masih

(57) ABSTRACT

A method and an apparatus for controlling aircraft rudder movement are disclosed. The system including a yaw damping control portion integrated with a directional compensation rudder control portion, such that the system may simultaneously provide yaw damping control and directional compensation.

21 Claims, 1 Drawing Sheet

METHODS AND APPARATUS SUITABLE FOR FACILITATING CONTROL OF AN AIRCRAFT RUDDER

TECHNICAL FIELD

The present invention generally relates to control systems. More particularly, the present invention relates to control systems suitable for controlling movement of an aircraft rudder.

BACKGROUND OF THE INVENTION

An aircraft often includes one or more control systems designed to control the aircraft rudder position during flight. Such systems are generally configured to manipulate the rudder position to (1) stabilize the aircraft during flight or (2) provide directional compensation when one or more aircraft engines loose power.

Stabilization or yaw damping control systems are generally designed to manipulate the aircraft rudder position to compensate for wind gusts, turbulence, phenomena such as Dutch roll, and the like. Typical yaw damping control systems include a motor or apparatus to move the rudder and a feedback control loop designed to control the motor and thus the rudder position.

Directional compensation systems are designed to facilitate directional control of the aircraft when the aircraft looses all or most of the power from one or more engines. For example, directional compensation systems are often employed to reduce an amount of force a pilot is required to apply to a rudder control system when one engine fails on a dual engine aircraft. An amount of force reduction that the compensation system provides may vary, depending on various factors such as the differential force provided by one or more engines on the aircraft, the type of aircraft, and aircraft manufacturer preferences. For example, an aircraft with relatively small engine thrust may not require any directional compensation, while aircraft with relatively large engine thrust would generally include a compensation system configured to facilitate rudder position, such that no more than about 150 pounds force is required by a pilot to maneuver the rudder to compensate for the engine power loss.

Aircraft including both stabilization and directional compensation systems generally include separate motors and control devices dedicated to each system. Although dedicating motors and control devices for each system may allow for relatively easy design of each of the respective systems, using two separate systems may be problematic in several regards. For example, aircraft including two separate rudder control systems generally operate such that only one rudder control system can function at any given time. Thus, the stabilization system generally does not operate when the directional compensation system is employed. Accordingly, improved aircraft rudder control systems that simultaneously provide both stabilization and directional compensation rudder control are desired.

Another problem associated with aircraft including dedicated rudder control systems is that such aircraft generally include superfluous control devices and/or rudder movement motors. Accordingly, improved rudder control systems which use a single control device and a single motor to provide both yaw damping stabilization and directional compensation control are desired.

SUMMARY OF THE INVENTION

The present invention provides improved apparatus for controlling aircraft rudder movement and position. The way in which the present invention addresses the deficiencies of now-known rudder control systems is discussed in greater detail below. However, in general, the present invention provides a single system suitable for simultaneously providing yaw-damping stability and directional-compensation rudder control.

In accordance with one exemplary embodiment of the present invention, a rudder control system includes a yaw damping stability portion integrated with a directional compensation portion. The integrated system includes a yaw damping command signal generator, a bias command signal generator, at least one summing junction configured to combine signals from the yaw damping and bias command signal generators, and a motor configured to receive the summed yaw damping and bias command signals and move an aircraft rudder in response to the summed signal.

In accordance with an exemplary embodiment of the present invention, the control system includes a bias command feed forward path configured to transmit a signal representative of engine thrust differential (difference in thrust between two or more engines on an aircraft) to the motor. In accordance with one aspect of this embodiment, the feed forward path includes a wash out filter and a lag filter. In accordance with another aspect of this embodiment, the feed bias command forward loop path includes one or more gain devices to facilitate turning of the control loop.

In accordance with a further embodiment of the present invention, the aircraft rudder control system includes a motor rate feedback loop configured to provide negative feedback to the system to reduce damping motion speed.

In accordance with another embodiment of the present invention, the aircraft rudder control system includes a motor current feedback path configured to a feedback signal based on motor load.

In accordance with yet another embodiment of the present invention, the bias command signal is transmitted through a feedback path including a signal filter configured to diminish the input bias command signal over time.

In accordance with a further exemplary embodiment of the present invention, the control system includes a second motor current feedback path configured to facilitate fine tuning or the rudder control motor.

BRIEF DESCRIPTION OF THE DRAWINGS

A more complete understanding of the present invention may be derived by referring to the detailed description and the claims, considered in connection with the figure, wherein:

DETAILED DESCRIPTION OF EXEMPLARY EMBODIMENTS

Figure 1:
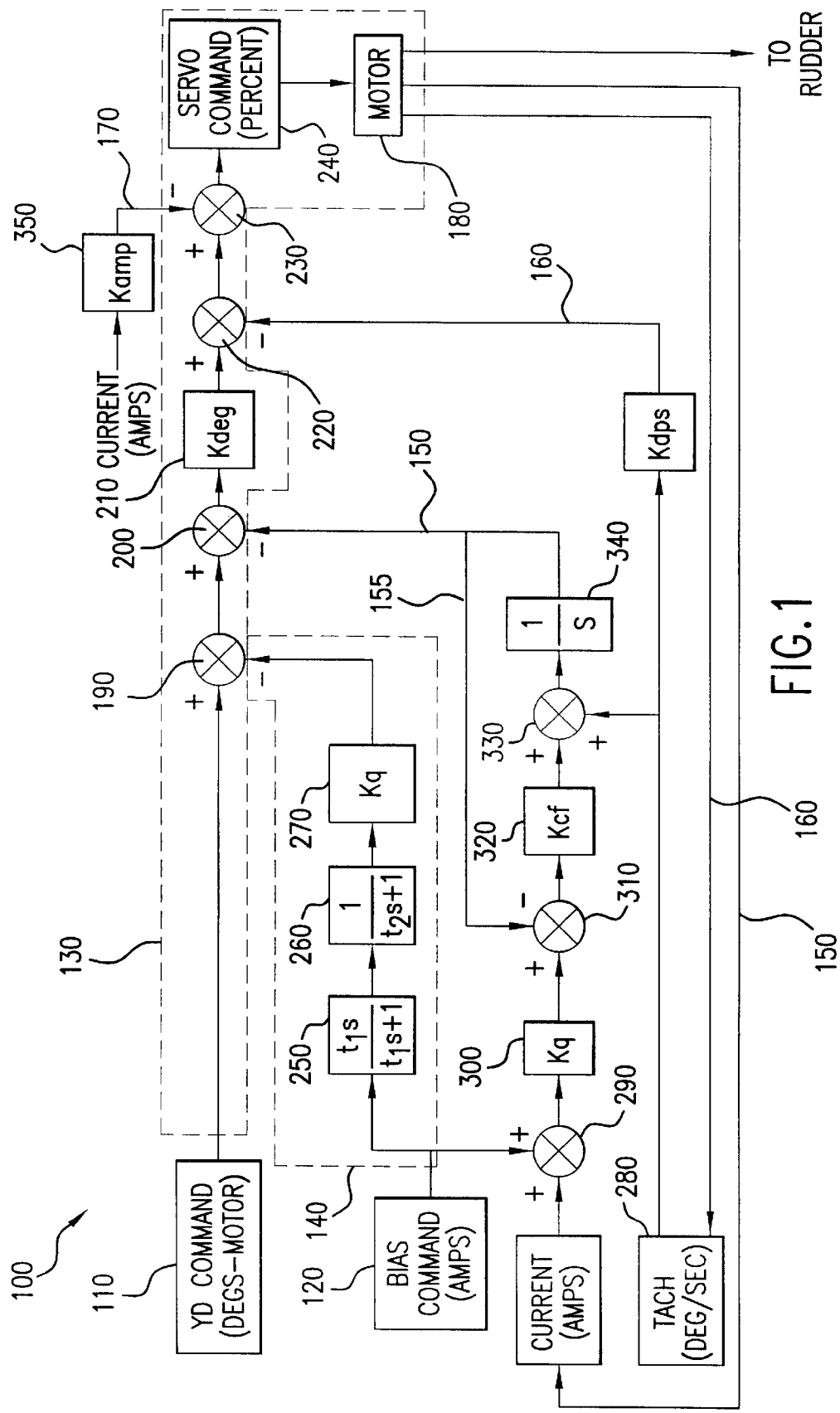
FIG. 1 is a schematic illustration of a feedback control system in accordance with the present invention.

The present invention generally relates to control systems. More particularly, the invention relates to an aircraft rudder control system. Although this invention may be used to provide rudder movement control to a variety of aircraft, the invention is conveniently described below in connection with providing rudder control to a multi-engine airplane.

FIG. 1 illustrates a schematic representation of a rudder control system 100 in accordance with an exemplary embodiment of the present invention. System 100 is generally configured to provide both yaw damping control and directional compensation to a rudder of an airplane.

As illustrated, system 100 includes a yaw damping command source 110, a bias command source 120, a yaw damping feed forward path 130, a bias command feed forward path 140, a first motor current feedback path 150, a motor rate feedback path 160, a second motor current feedback path 170, and a motor 180 configured to manipulate and control rudder position.

Yaw damping command source 110 is generally configured to provide an electronic signal indicative of an airplane's yaw rate or desired rudder position. In accordance with one exemplary embodiment of the present invention, command source 110 provides a signal indicative of an airplane's yaw rate, and the yaw rate signal is derived from a gyroscope and appropriate gain circuitry.

Bias command source 120 is generally configured to provide an electronic signal indicative of a thrust differential between two or more engines on the airplane. For example, bias command 120 may produce a signal indicative of engine power loss of an airplane engine. In accordance with one embodiment of the invention, bleed air pressure sensors are placed on the airplane engines and the sensors produce a signal indicative of airplane engine thrust.

Yaw damping feed forward path 130 is generally configured to transmit a signal from yaw damping command source 110, sum the yaw damping command signal with any bias command signal and any feedback signals, and transmit the summed signal to motor 180, such that motor 180 is manipulated in accordance with the summed or manipulated yaw damping command signal.

In accordance with one exemplary embodiment of the invention, path 130 includes a first summing junction 190, a second summing junction 200, a gain device 210, a third summing junction 220, a fourth summing junction 230, a servo motor command source 240, and motor 180. Summing junction 190 is suitably configured to combine the yaw damping command signal from source 110 with a bias command signal from path 140. Similarly, summing junctions 200, 220, and 230 are respectively configured to sum signals from feedback paths 150, 160, and 170 with the yaw damping command from source 110. Gain device 210 is suitably configured to provide signal amplification in path 130.

Path 140 is generally configured to provide a manipulated bias command signal from source 120 to summing junction 190 relatively quickly, and to eventually fade out the bias command to zero over time (over path 140), while mitigating any overshoot of the desired rudder position. In accordance with the exemplary embodiment of the invention illustrated in FIG. 1, path 140 includes a wash out filter 250, a lag filter 260, and an amplifier 270. Wash out filter 250 reduces the amplitude of the bias command signal over path 140 over time such that the original bias command over feed forward path 140 diminishes over time. Lag filter 260 increases an amount of time it takes the bias command signal to travel from source 120 to summing junction 190 over path 140. Although it may be desirable to provide the bias command to junction 190 and eventually the manipulated bias command to motor 180 relatively quickly, some delay within system 100 may be desirable to reduce or eliminate control command overshoot, while maintaining a sufficient signal to manipulate motor 180 as desired. Wash out filter 250 and lag filter 260 configuration may vary from application to application. However, in accordance with an exemplary embodiment of the present invention, for a small, twin jet business aircraft, wash out filter 250 includes a filter represented by the LaPlace transform equation, $$\frac{t_i S}{t_i S + 1}$$

where $t_i$ is 0.5; and filter 260 includes a filter represented by the LaPlace transform equation $$\frac{1}{t_2 S + 1},$$

where $t_2$ is 3.5.

Path 150 is designed to provide negative feedback for system 100 based on servo motor current, which is indicative of a load applied to motor 180. In accordance with one embodiment of the invention, path 150 includes a first summing junction 290, a first amplifier 300, a second summing junction 310, a second amplifier 320, a third summing junction 330, and a filter 340. Path 150 also includes a secondary feedback path 155. Summing junction 290 combines a motor current amp signal (from motor 180) and a bias command signal from source 120. Summing junction 310 combines the summed current amp and bias command signal from junction 190 with an integrated signal from feedback path 155. Summing the signal from junction 290 with a signal from feedback loop 155 provides an estimate of the servo command rate error. Similarly, signals from junction 310 and from loop 160 are combined at junction 330. Summing the rate signal from path 160 and the summed signal from junction 310 provides negative feedback to path 150, which provides an estimated servo motor rate feedback signal based on the measured motor rate and the servo load.

Filter 340 is suitably configured to convent the estimated servo motor rate feedback signal from junction 330 to an estimated servo motor position feedback signal. In accordance with one embodiment of the present invention, filter 340 includes an integrator.

Path 160 of system 100 is generally configured to provide negative rate feedback to system 100 to slow the speed at which motor 180 and consequently the rudder move as the rudder approaches its desired position. System 100 also includes feedback path 170 configured to provide high frequency damping to the server motor to facilitate rudder position control.

Amplifiers 210, 270, 300, 320, and 350, configuration may vary in accordance various embodiments of the present invention. However, when system 100 is used in connection with a Sino-Swearingen SJ30-2 aircraft, amplifier 210 has a gain constant of four percent per degree-motor, amplifiers 270 and 300 have a gain constant of 7500 degrees-motor per amp multiplied by the inverse of the normalized dynamic pressure, amplifier 300 has a gain constant of 2, and amplifier 350 has a gain constant of 75 percent per amp.

Although the present invention is set forth herein in the context of the appended drawing figure, it should be appreciated that the invention is not limited to the specific form shown. For example, while the invention is conveniently described above in connection with a dual-engine aircraft, the system may be used with other multi-engined aircraft. Various other modifications, variations, and enhancements in the design and arrangement of the method and apparatus set forth herein, may be made without departing from the spirit and scope of the present invention as set forth in the appended claims.

We claim:

1. A control system for producing a signal to manipulate a rudder of an aircraft comprising:

a yaw damping command source;

a motor coupled to said yaw damping command source, said motor configured to manipulate a position of the rudder;

a yaw damping feed forward path configured to transmit a yaw damping signal from said yaw damping command source to said motor;

a bias command source coupled to said motor; and a bias command feed forward path configured to transmit a bias command signal from said bias command source to said motor.

2. The control system according to claim 1, further comprising a motor current feedback path coupled to said yaw damping feed forward path.

3. The control system according to claim 2, wherein said motor current feedback path includes a first current summing junction configured to combine a motor signal and the bias command signal.

4. The control system according to claim 2, wherein said motor current feedback path includes a filter.

5. The control system according to claim 4, wherein said motor current feedback path includes a second summing junction configured to combine a signal from said first summing junction with a signal from said filter.

6. The control system according to claim 5, wherein said motor current feedback path includes a third summing junction configured to combine a motor rate signal with a signal from said second summing junction.

7. The control system according to claim 1, further comprising a summing junction configured to combine the signal said yaw damping feed forward path with a signal from a motor rate feedback path.

8. The control system according to claim 1, wherein said bias command feed forward path includes a wash out filter.

9. The control system according to claim 1, wherein said bias command feed forward path included a lag filter.

10. The control system according to claim 1, further comprising a high frequency control feedback load coupled to said yaw damping feed forward path.

11. An airplane rudder control system comprising:

a yaw damping feed forward control path including a yaw damping control source and a motor command source;

a bias command feed forward control path, including a bias command source coupled to said yaw damping feed forward control path; and a bias command feedback loop coupled to the bias command source.

12. The airplane rudder control system of claim 11, wherein said bias command feed forward control path further includes a wash out filter.

13. The airplane rudder control system of claim 11, wherein said bias command feed forward control path further includes a lag filter.

14. The airplane rudder control system of claim 11, further comprising a motor current feedback path coupled to said yaw damping feed forward path.

15. The airplane rudder control system of claim 14 further comprising a motor rate feedback path coupled to said motor current feedback path.

16. The airplane rudder control system of claim 11, further comprising a motor rate feedback path coupled to said yaw damping feed forward control path.

17. A method of controlling an aircraft rudder control motor, said method comprising the steps of:

providing a yaw damping command signal;

providing a bias command signal;

summing said bias command signal with a current amp signal;

filtering the sum of said bias command signal and said current amp signal; and summing the filtered bias command signal with the yaw damping command signal.

18. The method according to claim 17, further comprising the steps of:

measuring a motor current to obtain a motor rate signal; and summing the motor rate signal with said bias command signal.

19. The method according to claim 17, further comprising the steps of:

measuring a motor rate to obtain a motor rate signal; and summing the motor rate signal with a manipulated yaw damping signal.

20. The method according to claim 17, wherein said filtering step includes transmitting said bias command signal through a wash out filter to produce a manipulated bias command signal.

21. The method according to claim 17, further comprising the step of filtering said manipulated bias command signal using a lag filter.

* * * * *